C. W. KING.
Lawn or Garden Spinkler.

No. 214,778.        Patented April 29, 1879.

Witnesses.

Inventor.
Charles W. King
by attorney

UNITED STATES PATENT OFFICE.

CHARLES W. KING, OF BOSTON, MASSACHUSETTS.

IMPROVEMENT IN LAWN OR GARDEN SPRINKLERS.

Specification forming part of Letters Patent No. 214,778, dated April 29, 1879; application filed March 24, 1879.

*To all whom it may concern:*

Be it known that I, CHARLES W. KING, of Boston, in the county of Suffolk and State of Massachusetts, have invented a new and useful Improvement in Lawn or Garden Sprinklers; and do hereby declare the same to be described in the following specification and represented in the accompanying drawings, of which—

Figure 1:
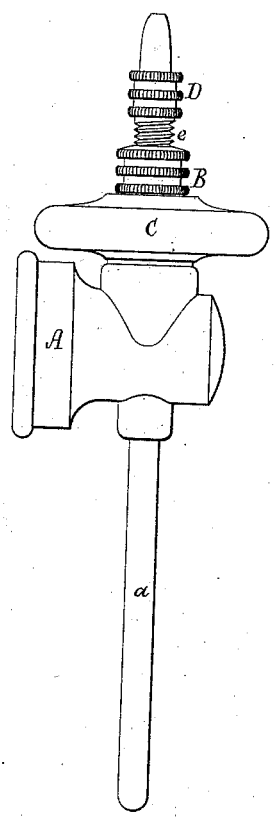
Figure 2:
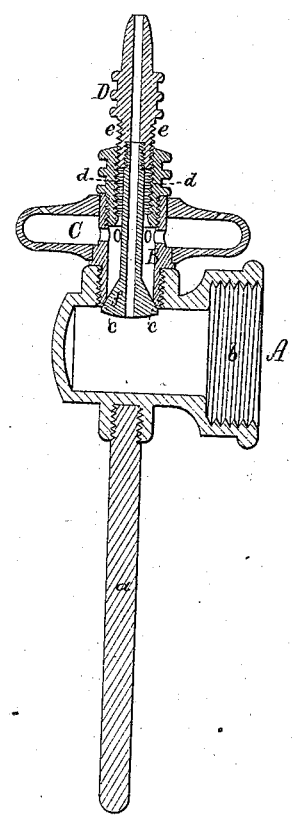

Figure 1 is a side elevation, and Fig. 2 a vertical section, of a sprinkler of my improved kind.

My invention consists in the combination of a rotary jet-pipe and its valve and screw with a chambered screw-coupler, its educt, and the rotary rose thereof, all being substantially as described and represented.

In such drawings, A denotes the chambered coupler, which is provided not only with a stem, $a$, for insertion in the ground, but with a female screw, $b$, to connect the coupler with a hydraulic hose. Projecting up from the coupler is an educt or tube, B, which constitutes a journal for a rose, C, to revolve on, there being openings leading laterally out of the educt and into the chamber of the rose. The rose, shaped as shown and chambered, has one or more openings leading obliquely out of it, and it may also be provided with others leading vertically out of it, the oblique openings being to eject water in such a manner against the air as to cause the rose to rapidly revolve on the main or pivotal educt B, which at its foot has a valve-seat, $c$, or in place thereof one is made in the coupler. At its head or upper part the educt B is provided with a female screw, $d$, to receive a corresponding male screw, $e$, formed on a jet-tube, D.

The said jet-tube extends down through the educt, and is provided with a valve, $f$, at its lower end to fit the seat $c$ at the lower part of or below the educt. The jet-tube, where within the educt B, has a diameter less than that of the bore of the educt, in order that when the valve is off its seat and water under pressure is driven into or within the coupler, such water shall not only escape into and through the rose, and thereby cause it to revolve on the principle of the well-known "Barker's Mill," but also at the same time be driven up through and out of the jet-pipe, so as to produce a *jet d'eau*.

On revolving the jet-pipe so as to bring the valve up to its seat, the water will be cut off from the rose, and will escape by the jet-pipe only.

I do not claim the combination of the coupler, the educt, and the rose; nor do I claim such as provided with the stem, as described.

What I claim as my invention is as follows, viz:

The combination of the rotary jet-pipe D and its valve $f$ and screw $e$ with the chambered screw-coupler A, its educt B, and rotary rose C, all being arranged, applied, and to operate substantially as set forth.

CHAS. W. KING.

Witnesses:
   R. H. EDDY,
   W. W. LUNT.